United States Patent
Bu et al.

(10) Patent No.: US 12,197,077 B2
(45) Date of Patent: Jan. 14, 2025

(54) SUPPORT FRAME WITH CONCAVE GROOVE, MANUFACTURING METHOD THEREOF, BACKLIGHT ASSEMBLY AND DISPLAY DEVICE

(71) Applicants: Beijing BOE Display Technology Co., Ltd., Beijing (CN); BOE TECHNOLOGY GROUP CO., LTD., Beijing (CN)

(72) Inventors: Zhanchang Bu, Beijing (CN); Haijun Shi, Beijing (CN); Bochang Wang, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/913,910

(22) PCT Filed: Oct. 28, 2021

(86) PCT No.: PCT/CN2021/126971
§ 371 (c)(1),
(2) Date: Sep. 23, 2022

(87) PCT Pub. No.: WO2022/188430
PCT Pub. Date: Sep. 15, 2022

(65) Prior Publication Data
US 2024/0210757 A1   Jun. 27, 2024

(30) Foreign Application Priority Data
Mar. 9, 2021   (CN) .......................... 202110256904.0

(51) Int. Cl.
*G02F 1/13357*   (2006.01)

(52) U.S. Cl.
CPC .... *G02F 1/133608* (2013.01); *G02F 2202/28* (2013.01)

(58) Field of Classification Search
CPC ...................... G02F 1/133608; G02F 2202/28
See application file for complete search history.

(56) References Cited

U.S. PATENT DOCUMENTS

| 2017/0299914 A1 | 10/2017 | Que | |
| 2017/0315408 A1* | 11/2017 | Lee | G02F 1/133605 |
| 2020/0310198 A1* | 10/2020 | Li | G02F 1/133606 |

FOREIGN PATENT DOCUMENTS

| CN | 102819131 A | 12/2012 |
| CN | 108153025 A | 6/2018 |

(Continued)

OTHER PUBLICATIONS

Pandiyaraj et al., Adhesive properties of polypropylene (PP) and polyethylene terephthalate (PET) film surfaces treated by DC glow discharge plasma, 2009, Elsevier, ScienceDirect, Vacuum 83, 332-339 (Year: 2009).*

*Primary Examiner* — Keith G. Delahoussaye
(74) *Attorney, Agent, or Firm* — HOUTTEMAN LAW LLC

(57) ABSTRACT

There is provided a support frame (2), including: a first support structure (3) having a first support surface provided with a concave groove (301); and a light-transmitting structure (4) on the first support surface, including: an engaging portion (401) and a light-transmitting portion (402), which are connected to each other, with the engaging portion (401) located in the groove (301) and fixed with the groove (301) by engagement, the light-transmitting portion (402) located outside the groove (301) and having a second support surface on a side of the light-transmitting portion (402)

(Continued)

opposite to the engaging portion (401), and the second support surface configured to support a display panel (1).

13 Claims, 5 Drawing Sheets

(56) References Cited

FOREIGN PATENT DOCUMENTS

| | | | |
|---|---|---|---|
| CN | 207895203 U | * | 9/2018 |
| CN | 207908839 U | | 9/2018 |
| CN | 110161751 A | | 8/2019 |
| CN | 209946590 U | | 1/2020 |
| CN | 210129366 U | | 3/2020 |
| CN | 115220263 A | * | 10/2022 |

* cited by examiner (a) (b) (c)

SUPPORT FRAME WITH CONCAVE GROOVE, MANUFACTURING METHOD THEREOF, BACKLIGHT ASSEMBLY AND DISPLAY DEVICE

CROSS-REFERENCE TO RELATED APPLICATIONS

This is a National Phase Application filed under 35 U.S.C. 371 as a national stage of PCT/CN2021/126971 filed on Oct. 28, 2021, an application claiming priority to Chinese patent application No. 202110256904.0, filed on Mar. 9, 2021, the content of each of which is incorporated herein by reference in its entirety.

TECHNICAL FIELD

The present disclosure relates to the display field, and in particular, to a support frame, a manufacturing method thereof, a backlight assembly and a display device.

BACKGROUND

In the display field, large-size spliced wall display has gradually become a hot spot, various splicing technologies including the Liquid Crystal Display (LCD) splicing technology, the small-pitch Light-Emitting Diode (LED) splicing technology, the Digital Light Processing (DLP) splicing technology, and the Organic Light-Emitting Diode (OLED) splicing technology are continuously developing, in which the LCD splicing technology and the small-pitch LED splicing technology are the mainstream technologies at present. With the development and progress of the LCD technology, a physical seam (i.e., a physical pliced gap) of an LCD spliced product has a width reduced from a 5 mm level to a 3 mm level to enter an era of 1 mm level.

SUMMARY

The present disclosure provides a support frame, a manufacturing method of a support frame, a backlight assembly, and a display device.

In a first aspect, embodiments of the present disclosure provide a support frame, including:
 a first support structure having a first support surface provided with a concave groove; and
 a light-transmitting structure on the first support surface, including: an engaging portion and a light-transmitting portion, which are connected to each other, with the engaging portion located in the groove and fixed with the groove by engagement, the light-transmitting portion located outside the groove and having a second support surface on a side of the light-transmitting portion opposite to the engaging portion, and the second support surface configured to support a display panel.

In some embodiments, the first support structure and the light-transmitting structure are arranged along a first direction, an orthogonal projection of a top opening of the groove on a plane perpendicular to the first direction has a first area, and an orthogonal projection of the whole groove on the plane perpendicular to the first direction has a second area which is larger than the first area.

In some embodiments, an area of a cross section of the groove gradually decreases along the first direction and a direction from a bottom of the groove to a top of the groove, and the cross section is perpendicular to the first direction.

In some embodiments, a longitudinal section of the groove is trapezoidal, and is parallel to the first direction and perpendicular to an extending direction of the groove.

In some embodiments, the first support surface is in a shape of ring;
 the groove is in a shape of ring; or
 a plurality of grooves are provided instead of the groove and are arranged in a shape of ring.

In some embodiments, the first support surface is a plane; or at least part of the first support surface is a concave cambered surface.

In some embodiments, the second support surface is a plane.

In some embodiments, the first support structure and the light-transmitting structure are arranged along a first direction; and a minimum distance between the second support surface and the first support surface along the first direction is greater than or equal to 1 mm.

In some embodiments, a material of the engaging portion is the same as that of the light-transmitting portion, and the engaging portion and the light-transmitting portion have a one-piece structure.

In some embodiments, the material of the engaging portion and the light-transmitting portion includes plastic.

In a second aspect, the embodiments of the present disclosure provide a backlight assembly, including: the support frame provided in the first aspect.

In a third aspect, the embodiments of the present disclosure provide a display device, including:
 a backlight assembly, which is the backlight assembly provided in the second aspect; and
 a display panel fixed on the second support surface with a fixing glue.

In a fourth aspect, the embodiments of the present disclosure provide a manufacturing method of the support frame provided in the first aspect, the manufacturing method including:
 forming the first support structure, which has the first support surface provided with the concave groove; and
 forming the light-transmitting structure on the first support surface, with the light-transmitting structure including: the engaging portion and the light-transmitting portion, which are connected to each other, the engaging portion located in the groove and fixed with the groove by engagement, the light-transmitting portion located outside the groove and having the second support surface on the side of the light-transmitting portion opposite to the engaging portion, and the second support surface configured to support the display panel.

In some embodiments, the engaging portion and the light-transmitting portion are made of a same material including plastic; and
 forming the light-transmitting structure on the first support surface includes:
 forming the light-transmitting structure on the first support surface by an injection molding process or a dispensing and curing process.

In some embodiments, the first support structure is made of a metal material; and
 forming the first support structure includes:
 forming the first support structure by an extrusion molding process.

DETAIL DESCRIPTION OF EMBODIMENTS

In order to enable one of ordinary skill in the art to better understand the technical solutions of the present disclosure, a support frame, a manufacturing method of a support frame, a backlight assembly, and a display device provided by the present disclosure will be described in detail below with reference to the drawings.

In a design of a spliced product having a 1 mm-level seam in the related art, a width of an edge BM (in a non-display region beyond a display region) of a typical LCD panel is only from 0.5 mm to 0.6 mm, while a width limit of a support surface, which is configured to support the LCD panel, of a support frame is generally 1 mm due to limitation of a formation process of the support frame, so that the support surface configured to support the display panel extends into the display region of the display panel, thereby blocking edge pixels in the display region. In such case, a size of an image actually displayed by the LCD panel is smaller than an actual size of the display region of the LCD panel, resulting in an increase of a visual seam between images displayed by any two adjacent display panels in the spliced product, which degrades user experience.

In addition, the blocking of the display region of the LCD panel by the support surface may have local differences. For example, when the support surface blocks two pixels in the first row, three pixels in the second row, and two and a half pixels in the third row, a colored line (also called a rainbow pattern) having a changed color may appear at edges of an image displayed by the LCD panel, which may degrade the user experience to a certain extent.

In view of at least one of the technical problems in the related art, the present disclosure provides corresponding technical solutions, which can overcome the technical problem of abnormal display of the conventional LCD panel due to the blocking of the edge pixels in the display region of the conventional LCD panel, and allow the edge pixels in the display region to perform display normally. In a spliced display process, the edge pixels in the display region can perform display normally, so that a visual seam between the images displayed by any two adjacent LCD panels are reduced, and no rainbow patterns appear at the edges of the displayed images, thereby effectively improving the user experience. A detailed description is given below in conjunction with specific embodiments.

Figure 1:
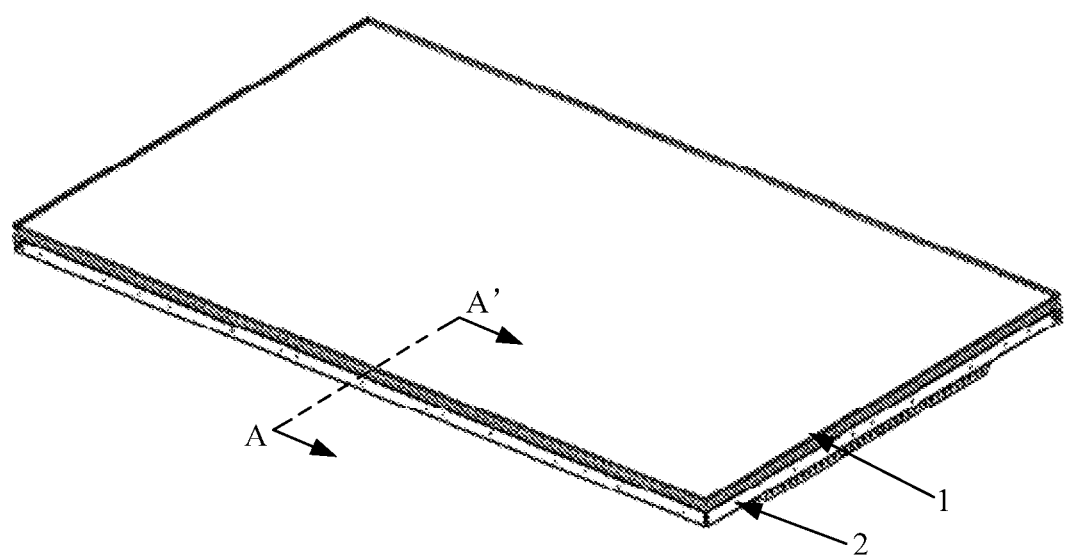
FIG. 1 is a schematic structural diagram of a display device according to embodiments of the present disclosure.

FIG. 1 is a schematic structural diagram of a display device according to the embodiment of the present disclosure. As shown in FIG. 1, the display device provided by the embodiments of the present disclosure is an LCD device, including: a display panel 1 and a support frame 2 configured to support the display panel 1. It should be noted that a case where the display device includes one display panel 1 and one support frame 2 is merely illustrated by FIG. 1 as an example, and is only for illustration. In some embodiments, the display device may include a plurality of display panels 1 and a plurality of support frames 2, so as to perform spliced display.

Figure 2:
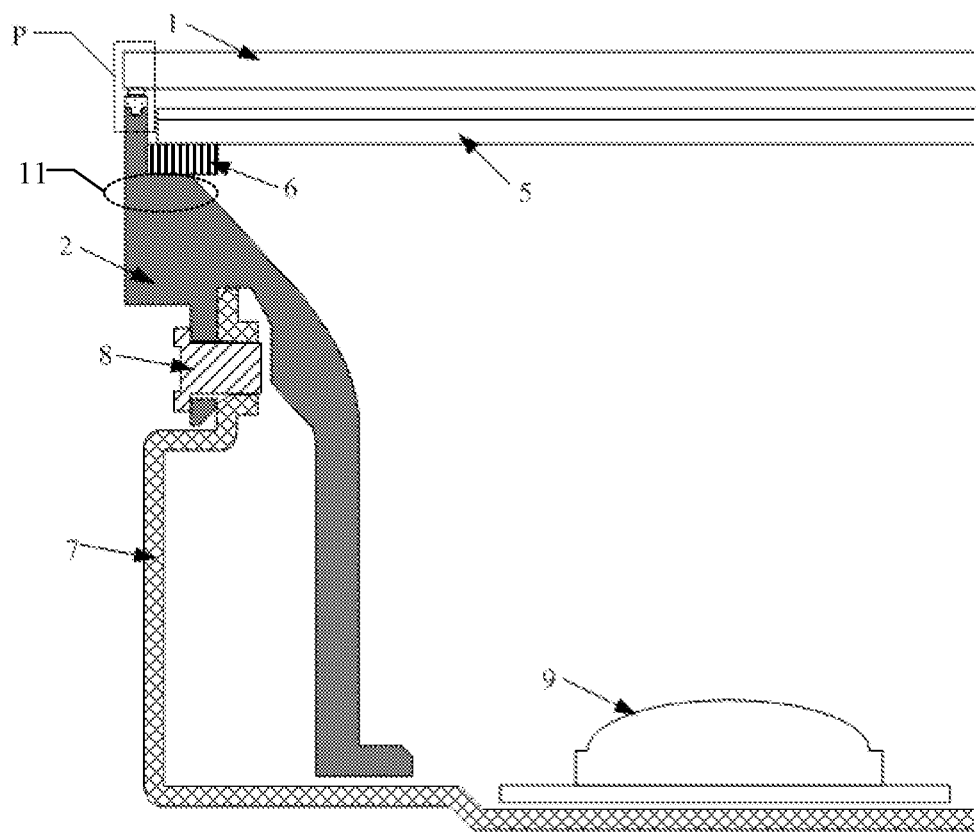
FIG. 2 is a sectional view taken along a line A-A' shown in FIG. 1.
Figure 3:
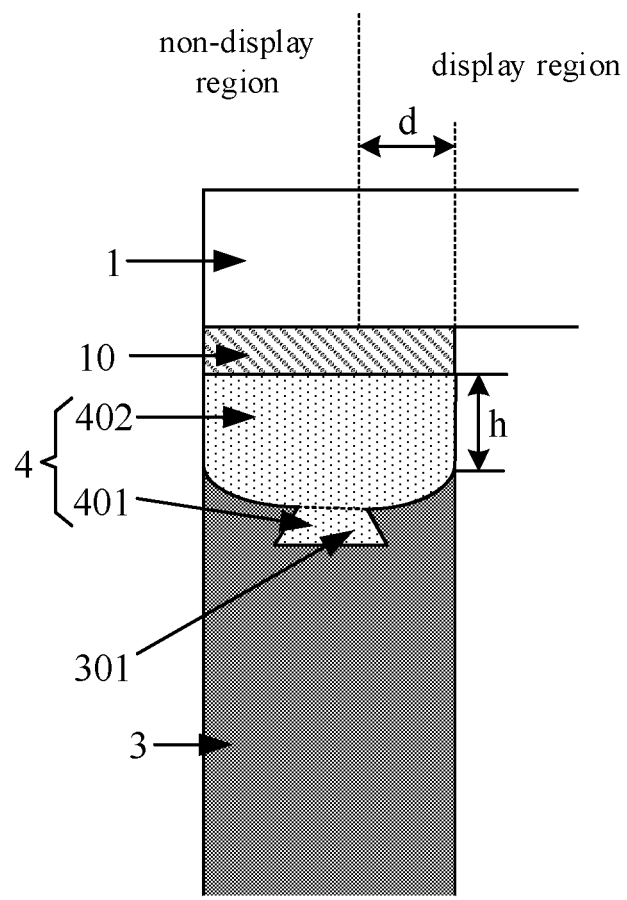
FIG. 3 is an enlarged view of a region P shown in FIG. 2.

FIG. 2 is a sectional view taken along a line A-A' shown in FIG. 1, and FIG. 3 is an enlarged view of a region P shown in FIG. 2. As shown in FIG. 2 and FIG. 3, the support frame 2 provided by the embodiments of the present disclosure includes: a first support structure 3 and a light-transmitting structure 4. The first support structure 3 has a first support surface provided with a concave groove 301; and the light-transmitting structure 4 is located on the first support surface, and includes: an engaging portion 401 and a light-transmitting portion 402, which are connected to each other. The engaging portion 401 is located in the groove 301 and is fixed with the groove 301 by engagement. The light-transmitting portion 402 is located outside the groove 301, and has a second support surface on a side of the light-transmitting portion 402 opposite to the engaging portion 401. The second support surface is configured to support the display panel 1.

In the embodiments of the present disclosure, the light provided by a backlight assembly can reach edge pixels in a display region of the display panel 1 through the light-transmitting portion 402 of the light-transmitting structure 4, so that the edge pixels in the display region of the display panel 1 can perform display normally. Meanwhile, the engaging portion 401 connected to the light-transmitting portion 402 can be fixed with the first support structure 3 by engagement, so as to effectively prevent the light-transmitting portion 402 from being stripped from the first support structure 3, thereby improving product reliability.

In some embodiments, the first support structure 3 and the light-transmitting structure 4 are arranged along a first direction (the vertical directions in FIG. 2 and FIG. 3), an orthogonal projection of a top opening of the groove 301 on a plane perpendicular to the first direction has a first area, and an orthogonal projection of the whole groove 301 on the plane perpendicular to the first direction has a second area which is larger than the first area. With the above design, the engaging portion 401 can be effectively fixed along the first direction after engaging with the groove 301.

In some embodiments, an area of a cross section of the groove 301 gradually decreases along the first direction and a direction from a bottom of the groove 301 to a top of the groove 301, and the cross section is perpendicular to the first direction.

Figure 4:
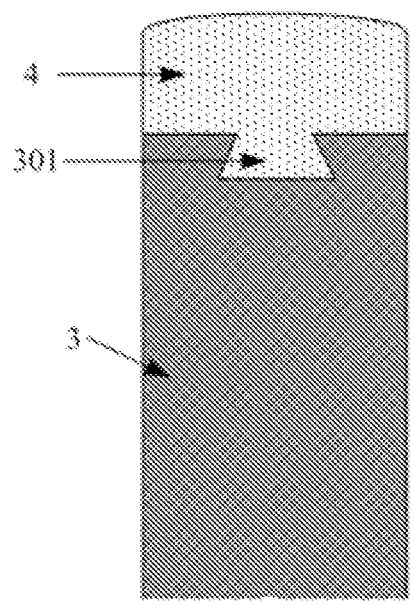
FIG. 4 is a sectional view of a first support structure and a light-transmitting structure according to the embodiments of the present disclosure.

FIG. 4 is a sectional view of the first support structure and the light-transmitting structure according to the embodiments of the present disclosure. As shown in FIG. 4, in some embodiments, a longitudinal section of the groove 301 is trapezoidal (i.e., is a trapezoid), and is parallel to the first direction and perpendicular to an extending direction of the groove 301.

Figure 5:
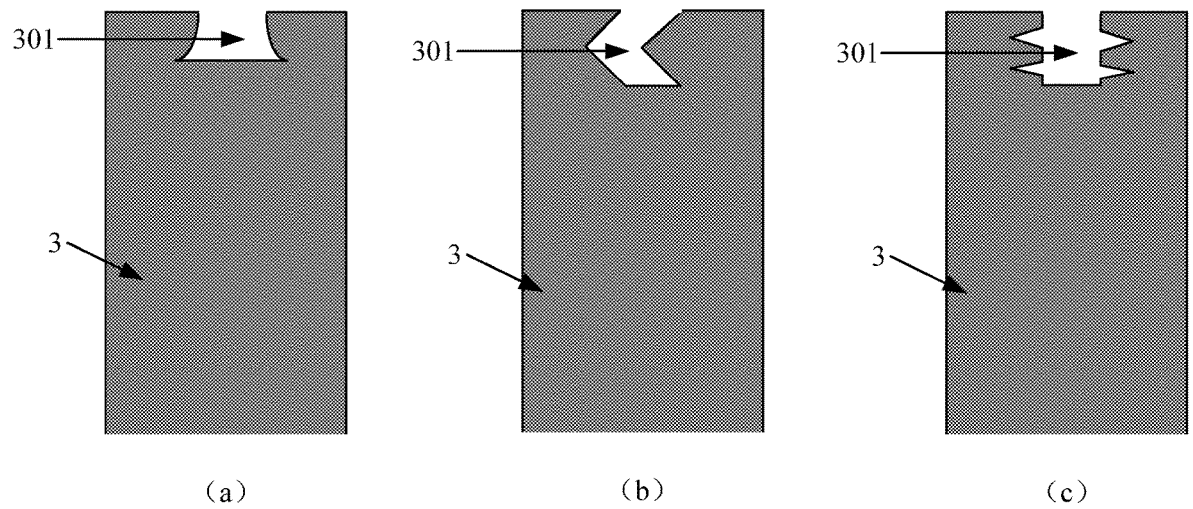
FIG. 5 shows sectional views of a plurality of different grooves according to the embodiments of the present disclosure.

FIG. 5 shows sectional views of a plurality of different grooves according to the embodiments of the present disclosure. As shown in FIG. 5, a shape of the longitudinal section of the groove 301 shown in (a) is similar to a trapezoid and has two curved lateral sides, and the area of the cross section of the groove 301 gradually decreases along the first direction and the direction from the bottom of the groove 301 to the top of the groove 301. A shape of the longitudinal section of the groove 301 shown in (b) is a zigzag line having a certain width, and the area of the cross section of the groove 301 is kept unchanged along the first direction and the direction from the bottom of the groove 301 to the top of the groove 301. A shape of the longitudinal section of the groove 301 shown in (c) includes a longitudinally extending first portion, and a transversely extending second portion on both sides of the first portion.

Apparently, the structure of the groove 301 in the embodiments of the present disclosure is not limited to the structures shown in FIG. 4 and FIG. 5, and the groove 301 may adopt other structures, which will not be listed here one by one.

Figure 6:
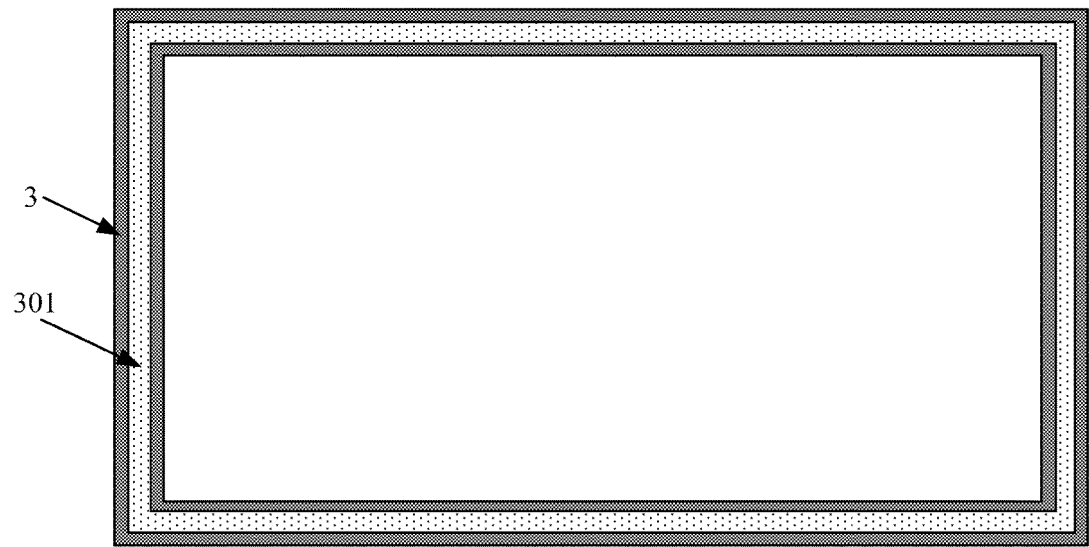
FIG. 6 is a top view of a first support surface and a groove according to the embodiments of the present disclosure.

FIG. 6 is a top view of the first support surface and the groove according to the embodiments of the present disclosure. As shown in FIG. 6, the first support surface is in a shape of ring (FIG. 6 illustrates a case of a ring whose center line forms a square). In some embodiments, the groove 301 is also in a shape of ring.

Figure 7:
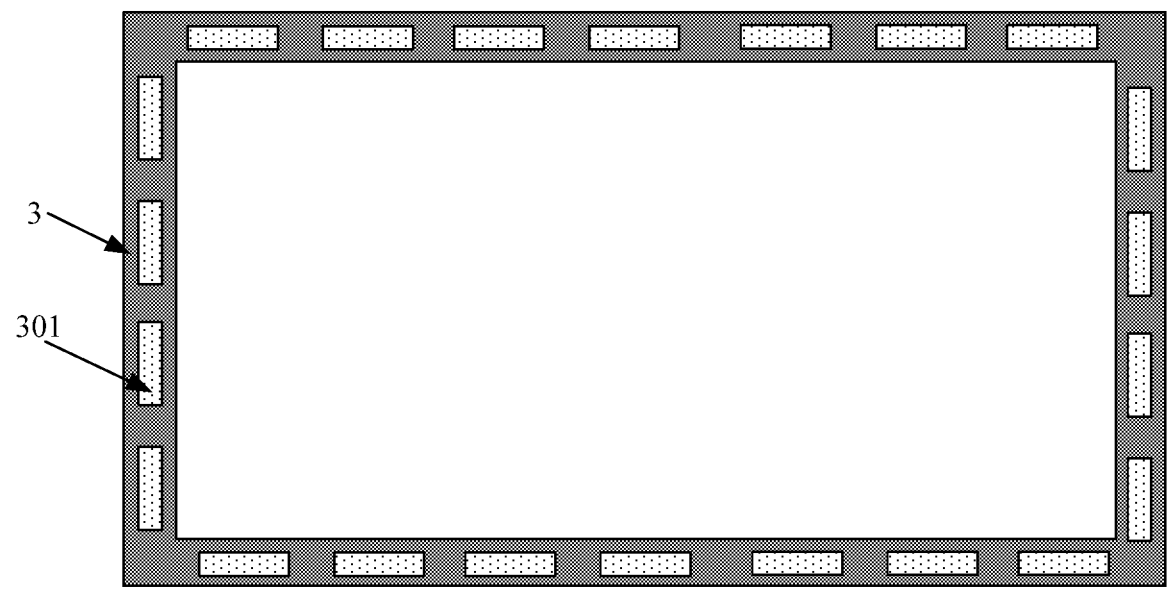
FIG. 7 is another top view of a first support surface and grooves according to the embodiments of the present disclosure.

FIG. 7 is another top view of the first support surface and the grooves according to the embodiments of the present disclosure. As shown in FIG. 7, unlike the case illustrated by FIG. 6, a plurality of grooves 301 are provided and are arranged in a shape of ring in FIG. 7.

Apparently, in the embodiments of the present disclosure, the groove(s) 301 may also be arranged on the first support surface in other forms, which will not be listed here one by one.

Still with reference to FIG. 4, the first support surface is a plane in some embodiments. In some embodiments, a material of the engaging portion 401 is the same as that of the light-transmitting portion 402, and the engaging portion 401 and the light-transmitting portion 402 have a one-piece structure (e.g., are integrally molded). More specifically, the material of the engaging portion 401 and the light-transmitting portion 402 includes plastic, and the light-transmitting structure 4 may be formed on the first support surface by an injection molding process or a dispensing and curing process. A liquid plastic is easy to be accumulated in the middle in a process of forming the light-transmitting structure 4, resulting in a convex cambered second support surface, which is unfavorable for subsequent fixation of the display panel 1 on the second support surface.

Figure 8:
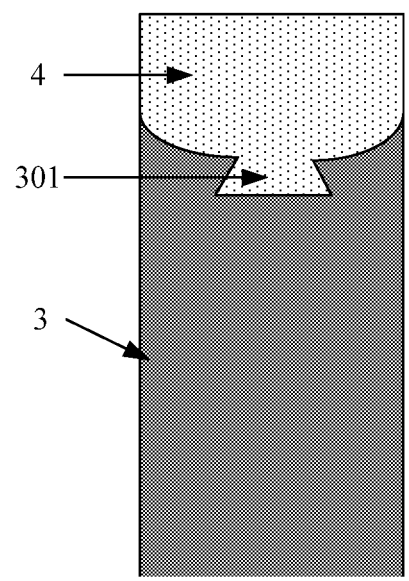
FIG. 8 is another sectional view of a first support structure and a light-transmitting structure according to the embodiments of the present disclosure.

FIG. 8 is another sectional view of the first support structure and the light-transmitting structure according to the embodiments of the present disclosure. As shown in FIG. 8, unlike the case illustrated by FIG. 4 where the first support surface is the plane, the first support surface shown in FIG. 8 is a concave cambered surface (or concave curved surface), by which the second support surface formed in the process of forming the light-transmitting structure 4 may be a plane, which is favorable for the subsequent fixation of the display panel 1 on the second support surface.

Apparently, it should be understood by one of ordinary skill in the art that a case where part of the first support surface is set to be a concave cambered surface also falls within the scope of the present disclosure, and a figure corresponding to such case is not provided herein.

Still with reference to FIG. 3, in order to ensure that the light provided by the backlight assembly can reach the edge pixels in the display region of the display panel 1 through the light-transmitting portion 402 of the light-transmitting structure 4, a thickness of a part of the light-transmitting portion 402 beyond the first support surface needs to meet a certain requirement.

For a certain side of the display panel 1, an edge area of the display region on such side covered by an orthogonal projection of the first support surface on the display panel 1 has a width d; in order to ensure that the light provided by the backlight assembly can reach the edge pixels covered by the orthogonal projection of the first support surface through the light-transmitting portion 402 of the light-transmitting structure 4, a minimum distance h between the second support surface and the first support surface along the first direction is set to satisfy h≥2d in the embodiments of the present disclosure. In addition, in order to avoid a fact that a final product is too thick due to a too thick light-transmitting portion 402, h≤3d is preferred. That is, when 2d≤h≤3d is satisfied, lightening and thinning of the whole product may be ensured while the edge pixels are irradiated with the light.

The width d of the edge area of the display region covered by the support surface is generally about 5 mm in a conventional product. In view of the above, the minimum distance h between the second support surface and the first support surface along the first direction is greater than or equal to 1 mm in some embodiments of the present disclosure. Apparently, in order to ensure the lightening and thinning of the whole product, the minimum distance h is also less than or equal to 1.5 mm at the same time.

Still with reference to FIG. 2, in some embodiments, the support frame 2 further includes a second support structure 11 having a third support surface, the first support structure 3 is on part of the third support surface, and the third support surface of the second support structure 11 is configured to fix optical components 5, which generally include: a light guide plate, a diffuser plate, and an optical film (e.g., a prism sheet, or a diffuser sheet). The light guide plate is generally fixed on the third support surface with a double-sided adhesive tape 6.

Based on the same inventive concept, the embodiments of the present disclosure further provide a backlight assembly, including a support frame 2 which adopts the support frame 2 provided by the above embodiments. Reference may be made to the contents of the above embodiments for a specific structure of the support frame 2, and thus the specific structure of the support frame 2 will not be repeated here.

The backlight assembly may further include a backplane 7, a light source 9 on the backplane 7 (a case where the light source 9 is a direct-type light source is illustrated in FIG. 2 as an example), and an optical film on a light-emitting side of the light source 9. The other structures of the support frame 2 may be specifically set as required. For example, the support frame 2 further includes a sidewall fixed with the backplane 7, and the sidewall of the support frame 2 is fixed with a sidewall of the backplane 7 with a screw 8 (as shown in FIG. 2) or by means of engagement.

Based on the same inventive concept, the embodiments of the present disclosure further provide a display device, including: a backlight assembly, and a display panel fixed on the second support surface with a fixing glue 10. The backlight assembly adopts the backlight assembly provided by the above embodiments, reference may be made to the above embodiments for a specific structure of the backlight assembly, and thus the specific structure of the backlight assembly will not be repeated here.

The display device in the embodiments of the present disclosure may be any product or component with a display function, such as an LCD television, an LCD monitor, a digital photo frame, a mobile phone, a tablet computer, or the like.

Figure 9:
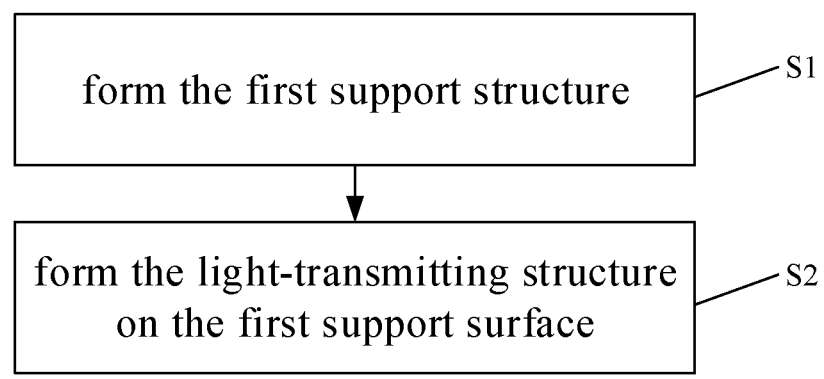
FIG. 9 is a flowchart illustrating a manufacturing method of a support frame according to the embodiments of the present disclosure.

Based on the same inventive concept, the embodiments of the present disclosure further provide a manufacturing method of a support frame, which may be used to manufacture the support frame provided by the above embodiments. FIG. 9 is a flowchart illustrating the manufacturing method of a support frame according to the embodiments of the present disclosure. As shown in FIG. 9, the manufacturing method includes the following steps S1 and S2.

In step S1, a first support structure is formed.

The first support structure has a first support surface provided with a concave groove.

In some embodiments, the first support structure is made of a metal material; further, the first support structure is made of aluminum; and in the step S1, the first support structure may be formed by an extrusion molding process. Apparently, the second support structure, the side walls and other structures described in the above embodiments may also be formed by the extrusion molding process while forming the first support structure by the extrusion molding process.

In step S2, a light-transmitting structure is formed on the first support surface.

The light-transmitting structure includes: an engaging portion and a light-transmitting portion, which are connected to each other, the engaging portion is located in the groove and is fixed with the groove by engagement, the light-transmitting portion is located outside the groove, and has a second support surface on a side of the light-transmitting portion opposite to the engaging portion, and the second support surface is configured to support a display panel.

In some embodiments, the engaging portion and the light-transmitting portion are made of the same material including plastic.

In some embodiments, the light-transmitting structure may be formed on the first support surface by an injection molding process. Specifically, the first support structure formed in the step S1 is placed and fixed in a cavity of an injection mold, and then the molten transparent plastic is injected into the cavity through an inlet of the mold to form an integral body together with the first support structure. In the injection molding process, the molten transparent plastic automatically fills the groove in the first support surface and is accumulated to a certain thickness, and then the engaging portion and the light-transmitting portion are formed after the plastic is cured.

In some embodiments, the light-transmitting structure may be formed on the first support surface by a dispensing and curing process. Specifically, the transparent liquid plastic is dispensed onto the first support surface through dispensing equipment, automatically fills the groove in the first support surface and is accumulated to a certain thickness, and then the engaging portion and the light-transmitting portion are formed after the plastic is cured.

The support frame provided by the embodiments of the present disclosure may be formed after the steps S1 and S2, a backplane (including a light source), optical components, a display panel, and the support frame may be assembled in subsequent processes, with the display panel fixed on the second support surface of the light-transmitting portion with a fixing glue.

The technical solutions of the present disclosure can overcome the technical problem of the abnormal display of the conventional LCD panel due to the blocking of the edge pixels in the display region of the conventional LCD panel, and allow the edge pixels in the display region to perform display normally. In the spliced display process, the edge pixels in the display region can perform display normally, so that a visual seam between the images displayed by any two adjacent LCD panels are reduced, and no rainbow patterns appear at the edges of the displayed images, thereby effectively improving the user experience.

It should be understood that the above embodiments are merely exemplary embodiments adopted to illustrate the principle of the present disclosure, and the present disclosure is not limited thereto. Various modifications and improvements can be made by one of ordinary sill in the art without departing from the spirit and essence of the present disclosure, and these modifications and improvements are considered to fall within the scope of the present disclosure.

What is claimed is:

1. A support frame, comprising:
   a first support structure having a first support surface provided with a concave groove; and
   a light-transmitting structure on the first support surface, comprising: an engaging portion and a light-transmitting portion, which are connected to each other, with the engaging portion located in the groove and fixed with the groove by engagement, the light-transmitting portion located outside the groove and having a second support surface on a side of the light-transmitting portion opposite to the engaging portion, and the second support surface configured to support a display panel;
   wherein the first support structure and the light-transmitting structure are arranged along a first direction, an orthogonal projection of a top opening of the groove on a plane perpendicular to the first direction has a first area, and an orthogonal projection of the whole groove on the plane perpendicular to the first direction has a second area which is larger than the first area; and
   wherein an area of a cross section of the groove gradually decreases along the first direction and a direction from a bottom of the groove to a top of the groove, and the cross section is perpendicular to the first direction.

2. The support frame of claim 1, wherein a longitudinal section of the groove is trapezoidal, and is parallel to the first direction and perpendicular to an extending direction of the groove.

3. The support frame of claim 1, wherein the first support surface is in a shape of ring;
   the groove is in a shape of ring; or
   a plurality of grooves are provided instead of the groove and are arranged in a shape of ring.

4. The support frame of claim 1, wherein the first support surface is a plane; or
   at least part of the first support surface is a concave cambered surface.

5. The support frame of claim 1, wherein the second support surface is a plane.

6. The support frame of claim 1, wherein the first support structure and the light-transmitting structure are arranged along a first direction; and
   a minimum distance between the second support surface and the first support surface along the first direction is greater than or equal to 1 mm.

7. The support frame of claim 1, wherein a material of the engaging portion is the same as that of the light-transmitting portion, and the engaging portion and the light-transmitting portion have a one-piece structure.

8. The support frame of claim 7, wherein the material of the engaging portion and the light-transmitting portion comprises plastic.

9. A backlight assembly, comprising: the support frame of claim 1.

10. A display device, comprising:
a backlight assembly, which is the backlight assembly of claim 9; and
a display panel fixed on the second support surface with a fixing glue.

11. A manufacturing method of a support frame, the support frame being the support frame of claim 1, the manufacturing method comprising:
forming the first support structure, which has the first support surface provided with the concave groove; and
forming the light-transmitting structure on the first support surface, with the light-transmitting structure comprising: the engaging portion and the light-transmitting portion, which are connected to each other, the engaging portion located in the groove and fixed with the groove by engagement, the light-transmitting portion located outside the groove and having the second support surface on the side of the light-transmitting portion opposite to the engaging portion, and the second support surface configured to support the display panel.

12. The manufacturing method of claim 11, wherein the engaging portion and the light-transmitting portion are made of a same material comprising plastic; and
forming the light-transmitting structure on the first support surface comprises:
forming the light-transmitting structure on the first support surface by an injection molding process or a dispensing and curing process.

13. The manufacturing method of claim 12, wherein the first support structure is made of a metal material; and
forming the first support structure comprises:
forming the first support structure by an extrusion molding process.

* * * * *